United States Patent [19]

Mizuno et al.

[11] 4,152,741
[45] May 1, 1979

[54] FERRITE CORE MAGNETIC HEAD WITH IMPROVED REINFORCEMENT FILLER

[75] Inventors: Hideaki Mizuno; Toshio Konno; Kunihide Sakai, all of Yokohama, Japan

[73] Assignee: Victor Company of Japan, Ltd., Yokohama, Japan

[21] Appl. No.: 856,963

[22] Filed: Dec. 2, 1977

[30] Foreign Application Priority Data

Dec. 7, 1976 [JP] Japan .................... 51-146788

[51] Int. Cl.² ........................................ G11B 5/251
[52] U.S. Cl. .............................. 360/119; 360/122
[58] Field of Search ............ 360/119, 120, 122, 125; 29/603

[56] References Cited

U.S. PATENT DOCUMENTS

| | | | |
|---|---|---|---|
| 3,369,292 | 2/1968 | Manders | 360/119 |
| 3,440,360 | 4/1969 | Sugaya | 360/119 |
| 3,579,214 | 5/1971 | Solyst | 360/119 |
| 3,605,259 | 9/1971 | Tawara et al. | 29/603 |
| 3,634,933 | 1/1972 | Hanak | 29/603 |
| 3,683,126 | 8/1972 | Krause | 360/122 |
| 3,721,000 | 3/1973 | Okamoto et al. | 29/603 |
| 3,928,908 | 12/1975 | Case | 360/122 |

*Primary Examiner*—Alfred H. Eddleman
*Attorney, Agent, or Firm*—Fleit & Jacobson

[57] ABSTRACT

A ferrite core magnetic head useful in a video tape recorder is reinforced in regions near its magnetic gap by the application of a filling material which is a mixture of a glass composition such as a lead glass and a powdered electrically conducting and nonmagnetic material such as a conducting metal oxide or a metal. In thermal expansion coefficient, the glass for the filling material must be comparable to the core material of the head. The use of this filling material precludes cracking of the core by heat treatments during fabrication and deposition of dust on the head surface during operation.

14 Claims, 5 Drawing Figures

FERRITE CORE MAGNETIC HEAD WITH IMPROVED REINFORCEMENT FILLER

BACKGROUND OF THE INVENTION

This invention relates to a magnetic head for magnetic recording and reproducing systems such as video tape recorders, which head utilizes an oxide ferromagnetic material as its core material, and more particularly to the use of an improved reinforcement filling material in this type of magnetic head.

A ferrite core magnetic head is now widely used in magnetic recording and reproducing systems for audio and video informations. In a magnetic head of this type, usually two pieces of core members of an oxide ferromagnetic material generally called ferrite, which may be either a single crystal or a molded and sintered mass, are integrated into a core by a glass-bonding technique with the result that a very thin glass film interposed between the two core members gives the magnetic gap of the head. The magnetic gap is made to have a predetermined width corresponding to the track width of a magnetic tape to which the head is applied by shaping appropriately one or both of the core members in their edge portions with respect to a surface subject to glass-bonding. To ensure the bonding of the two pieces of core members and reinforce the magnetic head so as to preclude breaking or cracking of the integrated core particularly in regions shaped for affording a proper width to the magnetic gap, it is a common practice to fill up depressions which are formed in the integrated core as the result of the shaping with a reinforcement filling material so that the lateral edges of the magnetic gap may be covered with the filling material. Until now, a glass composition (an oxide system) which is similar to the core material in hardness (in a solidified state after melting) is used as the filling material for this purpose.

However, conventional ferrite core magnetic heads of the above described construction suffer disadvantages in the following two respects.

The first problem is the charging of the head during operation at its surface brought into contact with a magnetic tape. A Mn-Zn ferrite as a typical example of oxide ferromagnetic materials useful as the core material has a relatively low resistivity, below 1 $\Omega$.cm for single crystal and of the order of $10^2$ $\Omega$.cm for sintered mass, but a glass composition used as the reinforcement filling material has a far greater resistivity such as $10^{12}$ $\Omega$.cm for soda lime glass and $10^{14}$ $\Omega$.cm for lead glass (as volume resistivity). A magnetic tape too has a considerably high resistivity. For example, conventional video tapes exhibit surface resistivities of $10^8$ $\Omega$ or greater. Accordingly, rubbing of a magnetic head with glass faces adjacent the magnetic gap against a magnetic tape causes not only the tape but also the rubbing surface of the head to be charged electrostatically. As a result, dust in the atomsphere and fine particles of a magnetic material rubbed out from the tape are attracted to and deposit on the rubbing surface of the head. This causes lowering in the recording or reproducing sensitivity of a recording and reproducing system in which the magnetic head is included. In an extreme case for a video tape recorder, there occurs a lack of reproduced picture frames due to the deposition of dust and or the magnetic material particles on the head surface.

The second problem is the damage of the core of the magnetic head attributable to a difference in thermal expansion coefficient between the core material and the reinforcement filling material. The thermal expansion coefficient and its temperature dependence differ from material to material. Oxide ferromagnetic materials generally exhibit an almost linear increase in their thermal expansion coefficient (per ° C.) with a rise in temperature up to considerably high temperatures, for example up to about 700–800° C. for a Mn-Zn ferrite. For glass compositions, however, a nearly linear increase in the thermal expansion coefficient (per ° C.) ceases at far lower temperatures (for example, at about 500° C. for a kind of lead glass). Thereafter the rate of increase in the expansion coefficient with temperature exhibits a rise for a while, followed by a decrease in the expansion coefficient with further increase in temperature. Even if the thermal expansion coefficient of a glass composition used as the reinforcement filling material is close to that of the core material at relatively low temperatures, heating of the glass composition together with the core material to a temperature above the softening point of the glass to accomplish filling up of the aforementioned depressions with the glass results in that two kinds of materials of different thermal expansion coefficients are integrated and heated together. From this reason the fabrication of conventional ferrite core magnetic heads frequently suffers from the occurrence of microcracks in the core, particularly at the surface to be contacted with a magnetic tape.

SUMMARY OF THE INVENTION

It is an object of the present invention to provide a ferrite core magnetic head which is hardly charged at its contact surface upon rubbing contact with a magnetic tape and accordingly does not suffer from deposition of powdery foreign matter such as dust thereon.

It is another object of the invention to provide a ferrite core magnetic head of the described type, which head can be produced without being accompanied by the appearance of microcracks in the core in regions near the magnetic gap of the head.

A magnetic head according to the invention has a core of a conventional oxide ferromagnetic material, and the core is so shaped as to provide a magnetic gap with a width corresponding to the track width of a magnetic tape to which the head is applied. In these respects this magnetic head is of a known construction. As a novel feature of this magnetic head, depressions which are formed in the head adjacent the magnetic gap in the width direction of the gap as the result of the shaping of the core to provide the gap are filled with a reinforcement filling material which is a mixture of a glass composition whose thermal expansion coefficient is nearly equal to that of the material of the core and a powdered electrically conducting and nonmagnetic material. This filling material is once fluidized in the depressions and takes the state of a solidified glass in the finished magnetic head.

An example of the glass composition is a lead glass. The conducting and nonmagnetic material is preferably a metal oxide such as a Zn-ferrite whose thermal expansion coefficient is close to that of the core material but may also be chosen among nonmagnetic metals and cermets.

DESCRIPTION OF PREFERRED EMBODIMENTS

Figure 1:
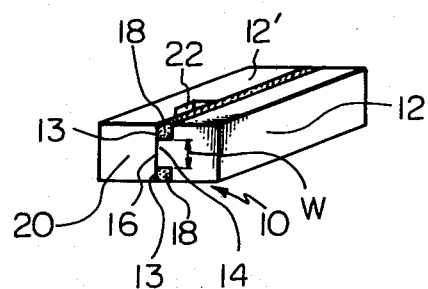
FIG. 1 is a perspective view of a magnetic head according to the invention.

FIG. 1 shows a magnetic head 10 according to the invention. (The coil of the magnetic head 10 is omitted from illustration for simplicity.) This magnetic head 10 is fundamentally of a known construction, and the illustrated shape of a rectangular hexahedron is merely by way of example. A ferromagnetic oxide material such as a conventional Mn-Zn ferrite is used as the core material of this magnetic head 10, and two blocks 12 and 12' both having fundamentally the shape of a rectangular prism constitute the core of this magnetic head 10. One (12) of the core members 12, 12' has been cut along its two parallel edges on the same side so as to form a cross-sectionally rectangular projection 14 on its one side. The top face of this projection 14 is opposed to a side face of the other core member 12' and the two core members 12, 12' are bonded together with a molten glass composition as the adhesive. The solidification of the glass results in that a thin glass film indicated at 16 is interposed between the opposed faces of the core members 12 and 12' to serve as the magnetic gap of the magnetic head 10. The width W (in the direction parallel to the glass film 16) of the projection 14 becomes the width of the magnetic gap 16 of this head 10 (the length of the magnetic gap 16 is the thickness of the glass film 16.) and, therefore, is made to correspond to the track width of a magnetic tape with which the head 10 is made to contact at a surface 20 thereof.

The above described cutting of the core member 12 results in that the magnetic head 10 has a linear groove 13 on each side (in the lateral direction) of the magnetic gap (glass film) 16. The grooves 13 are filled up with a reinforcement filling material 18 according to the invention to protect the magnetic gap 16 and reinforce the head 10. As described hereinbefore, the reinforcement filling material 18 is a mixture of a glass composition whose thermal expansion coefficient (per ° C.) is nearly equal to that of the ferromagnetic material of the core members 12, 12' (when a glass bonding technique is employed to provide the magnetic gap 16, over a temperature range from room temperature to around the softening point of the glass used for the bonding) and a powdered material which is electrically conducting and nonmagnetic but does not belong to glass in any sense. A glass composition having a suitable thermal expansion coefficient can be selected among conventional lead glass compositions. Examples of useful conducting and nonmagnetic materials are electrically conducting oxides such as a Zn-ferrite expressed by the formula $Fe_2Zn_{1-x}Ti_xO_4$ where x is 0.05 by way of example, $In_2O_3$ and $SnO_2$; nonmagnetic metals such as Cr; and cermets such as a SiO-Cr system. The conducting powder material in the reinforcement material 18 is dispersed in a matrix of the glass and amounts to about 10–80%, preferably about 20–50%, by volume of the reinforcement material 18.

It is preferable that the thermal expansion coefficient (per ° C.) of the reinforcement filling material too is close to that of the core material (over the aforementioned temperature range). Accordingly it is perferable that the choice of a conducting and nonmagnetic powder material be done also taking into consideration its thermal expansion coefficient in correlation to the expansion coefficient of the chosen glass composition. In this regard, the use of a conducting metal oxide powder, particularly a ferrite powder, is preferred to the use of a metal powder or a cermet powder.

The mixture of the glass composition and the conducting powder is prepared in a wet state by the use of an organic solvent and squeezed into the grooves 13 at a suitable state of the production of the magnetic head 10 as will be described hereinafter. Then the mixture in the grooves 13 is fluidized by heating in, for example, nitrogen gas to a temperature above the softening point of the glass composition. Upon cooling of the fluidized mixture to room temperature, the reinforcement material in the grooves 13 comes to a solidified glass state.

The magnetic head 10 has an aperture 22 through which a coil is wound around the core member 12'. In the illustrated case this aperture 22 is given by a slot formed on the bonded side face of the core member 12'.

A fundamental known method of producing this magnetic head 10 will be described with reference to FIGS. 2 and 3. A plate-shaped block 112 of a ferromagnetic material such as a Mn-Zn ferrite, which may be either a single crystal or a molded and sintered mass, is employed as the raw material of the core member 12 of the magnetic head 10. A number of parallel grooves 113 are formed on a flat surface 112a of this plate 112 at equal and predetermined intervals. As a result, the plate 112 has a number of parallel and identical ridges 114 each with a width W in the plane of the surface 112a. This width W of the ridges 114 (each interval between the grooves 113) is so determined as to correspond to the track width of a magnetic tape. Then the grooves 113 are filled up, for example, with a powdery mixture (as the above described reinforcement material 18) of 70 vol% of a lead glass composition whose softening point is about 550° C. and 30 vol% of the above described Zn ferrite through the steps of squeezing in a wet state, heating for fluidization (in $N_2$ at 730° C. for about 30 min) and cooling for solidification. Thereafter the surface 112a of the plate 112 is polished to become a mirror face. As a modification, the reinforcement filling material 18 may be prepared by initially melting the glass composition alone and then adding the conducting powder into the glass melt. Upon cooling to room temperature, the reinforcement material 18 is obtained in the state of a solidified glass. In this case the reinforcement material 18 is placed in each of the grooves 113 in the form of, for example, a strip and remelted in the grooves 113.

Figure 3:
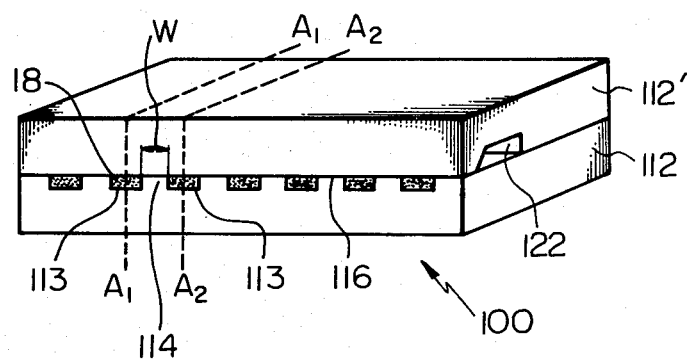
FIG. 3 is a perspective view of an assembly of the plate of FIG. 2 and another ferrite plate of the same material, which assembly gives the magnetic head of FIG. 1 by severance.

The thus processed plate 112 is bonded at its grooved surface 112a to a second plate-shaped block 112' of the same ferromagnetic material as shown in FIG. 3 with application of a molten glass composition (indicated at 116) as an adhesive in a uniform and predetermined thickness. In advance, the second plate 112' is machined to have a slot 122 on its surface to be bonded to the first plate 112. This slot 122 is made to extend generally normal to the grooves 113 of the first plate 112 in an assembly 100 given by bonding of the two plates 112 and 112'. The glass composition used for glass-bonding of the plates 112 and 112' is one which softens at a temperature lower than the softening point of the glass composition used in the reinforcement material. For example, the glass-bonding operation is accomplished satisfactorily at a temperature of about 650° C. by the use a glass composition whose softening point is about 530° C. when the above described mixture of a lead glass and a Zn ferrite powder is used as the reinforcement filling material 18.

Thereafter the assembly 100 is severed into a number of pieces along planes represented in FIG. 3 by broken lines $A_1$—$A_1$ and $A_2$—$A_2$ each of which divides each groove 113 into longitudinal halves. Each piece obtained by the severance becomes the magnetic head 10 of FIG. 1.

Since the glass composition used as the basic material of the reinforcement material 18 according to the invention has a thermal expansion coefficient nearly equal to that of the ferromagnetic materil of the blocks 112, 112', i.e. the core members 12, 12', the production of the magnetic head 10 through heat treatments for filling up the grooves 113 with the reinforcement material 18 and interposing the glass film 116 between the two blocks 112, 112' can be accomplished without causing cracking of the core members 12, 12' at the surface 20 which comes into contact with the tape.

The reinforcement material 18 according to the invention comprises a considerable amount of conducting powder and hence has a greatly lower electric resitivity than currently employed reinforcing materials. Accordingly, a rubber contact of the magnetic head 10 at its surface 20 with a magnetic tape does not give rise to electrical charging of the reinforcement material 18 molded in the grooves 13 and exposed at the surface 20. There occurs, therefore, little deposition of adhesion of dust or magnetic powder rubbed out from the magnetic tape to the contact surfce 20 in regions near the magnetic gap 16 of the magnetic head 10 during operation of a reproducing system, so that a reproducing process can be accomplished without suffering gradual lowering of the reproducing sensitivity and/or troubles such as occasional lack of reproduced television picture frames.

Figure 2:
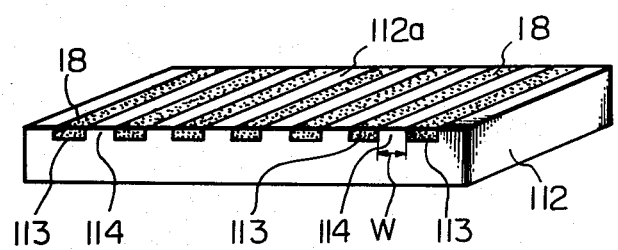
FIG. 2 is a perspective view of a grooved plate of a ferromagnetic material for the production of the magnetic head of FIG. 1.
Figure 4:
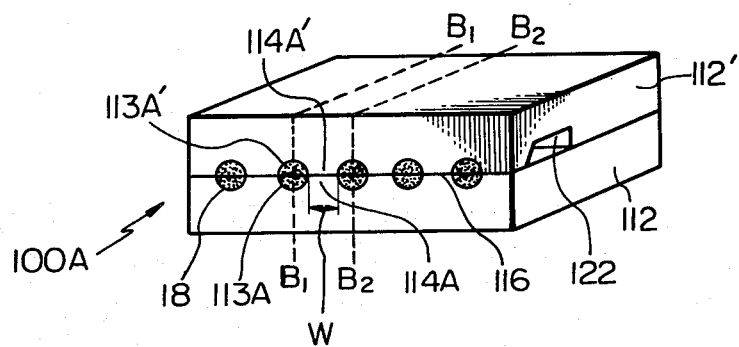
FIG. 4 shows a slight modification of the assembly of FIG. 3.

The arrangement of the molded reinforcement material 18 with respect to the magnetic gap 16 illustrated in FIGS. 1–3 is not more than an example. In FIG. 4, the first plate 112 of a ferromagnetic material has a number of parallel grooves 113A formed fundamentally as illustrated in FIG. 2, and the second plate 112' of the same material too has grooves 113A' formed identically with the grooves 113A of the first plate 112. These grooves 113A and 113A' of the two plates 112, 112' are all filled up with the reinforcement material 18 by the above described procedures. Then the two plates 112 and 112' are united into a block 100A by the above described glass-bounding method in such a manner that each of the grooves 113A' of te second plate 112' extends exactly above each of the grooves 113A of the first plate 112. This assembly 100A is divided into a number of pieces by severance along planes represented by the broken lines $B_1$–$B_1$ and $B_2$–$B_2$ each of which divides a linear mass of the reinforcement material filling up a union of a groove 113A and a groove 113A' into longitudinal halves. A magnetic head 10A shown in FIG. 5 is the product of the fabrication method described with reference to FIG. 4 and, as will be apparent, has fundamentally the same properties as the magnetic head 10 of FIG. 1.

Figure 5:
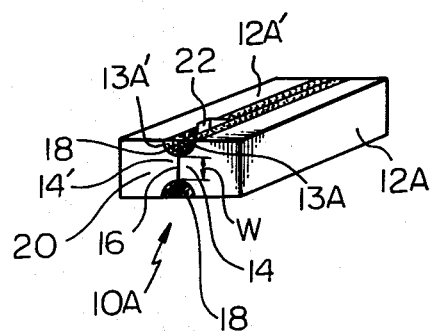
FIG. 5 is a perspective view of a magnetic head produced by severing the assembly of FIG. 4.

The magnetic head 10A of FIG. 5, for example, may alternatively be produced by omitting the provision of the grooves 113A and 113A' (naturally the reinforcement material 18 too) for the block 100A of FIG. 4 and instead slotting the semi-finished head (10A) to cut out marginal regions of the glass film 16, followed by filling up of the resultant two grooves with the conducting reinforcement material 18.

What is claimed is:

1. A magnetic head for magnetic recording and reproducing systems, comprising:
   a core of an oxide ferromagnetic material shaped to provide a magentic gap with a width corresponding to the track width of a magnetic tape two which the the head is to be applied, resulting in the presence of depressions in said core in regions adjacent to said magnetic gap in the width direction of said magnetic gap; and
   a solid mass of a reinforcement filling material which fills up each of said depressions, said filling material being a mixture of a glass composition the thermal expansion coefficient of which is nearly equal to the thermal expansion coefficient of said oxide ferromagnetic material and a powdered electrically conducting and nonmagnetic material, said filling material having been once in a fluidized state in each of said depressions.

2. A magnetic head as claimed in claim 1, wherein the amount of said conducting and nonmagnetic material in said filling material is in the range from about 10 to about 80% by volume.

3. A magnetic head as claimed in claim 2, wherein said conducting and nonmagnetic material is a metal oxide system.

4. A magnetic head as claimed in claim 3, wherein said metal oxide system is a Zn-ferrite expressed by the general formula $Fe_2Zn_{1-x}Ti_xO_4$.

5. A magnetic head as claimed in claim 4, wherein x in said formula is 0.05.

6. A magnetic head as claimed in claim 2, wherein said conducting and nonmagnetic material is a metal.

7. A magnetic head as claimed in claim 2, wherein said conducting and nonmagnetic material is a cermet.

8. A magnetic head as claimed in claim 2, wherein said glass composition is a lead glass composition.

9. A magnetic head as claimed in claim 1, wherein each of said depressions is a linear groove extending generally normal to the length direction of said magnetic gap.

10. A magnetic head as claimed in claim 9, wherein said magnetic gap is provided by a thin glass film sandwhiched between two opposed surfaces of said core.

11. A magnetic head as claimed in claim 10, wherein said core is an assembly of two core members which are bonded with said glass film.

12. A magnetic head as claimed in claim 10, wherein said glass composition has a softening point higher than the softening point of the material of said glass film.

13. A magnetic head as claimed in claim 8, wherein said electrically conducting and nonmagnetic material is a Zn-ferrite.

14. A magnetic head as claimed in claim 5, wherein the amount of said Zn-ferrite in said filling material is in the range from about 20 to about 50 % by volume.

* * * * *